United States Patent Office 3,283,470
Patented Nov. 8, 1966

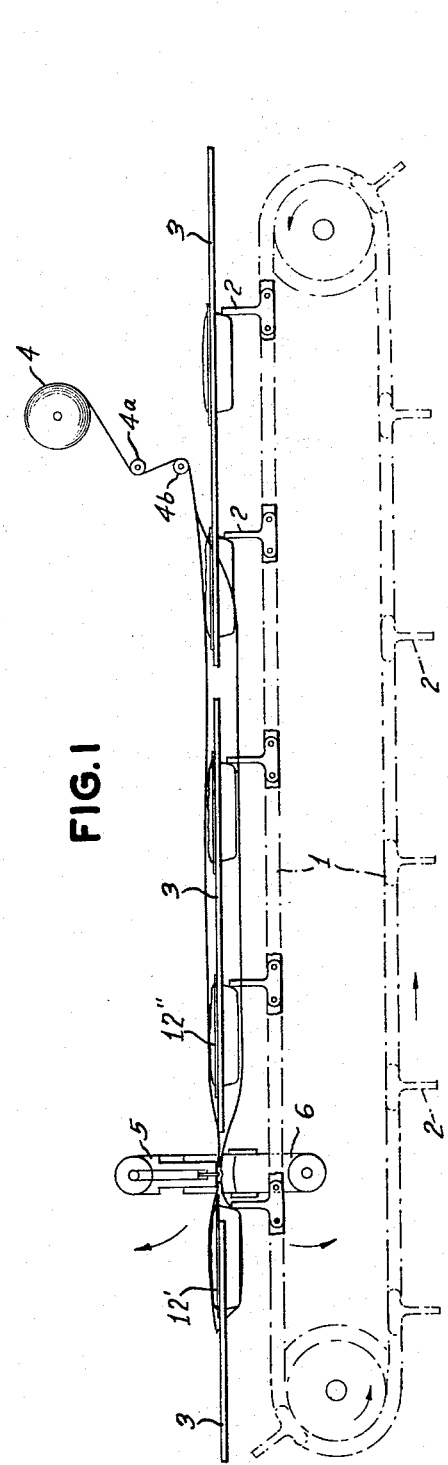
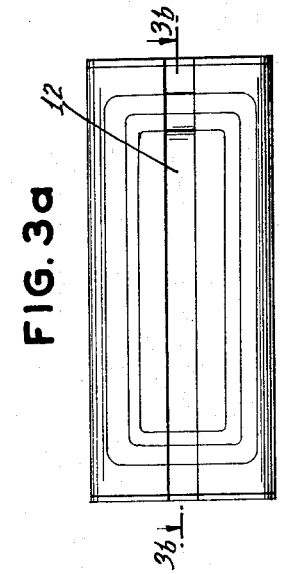

3,283,470
METHOD OF AND APPARATUS FOR WRAPPING GOODS IN A FILM WRAPPER
Heinz Oelze, Wiesbaden-Biebrich, and Franz Hartleib, Furstenau, Kreis Bersenbruck, Germany, assignors to Kalle Aktiengesellschaft, Wiesbaden-Biebrich, Germany
Filed Apr. 26, 1963, Ser. No. 276,699
Claims priority, application Germany, Apr. 28, 1962, K 46,603
15 Claims. (Cl. 53—33)

This invention relates to a method of and apparatus for wrapping goods in a film wrapper.

The wrapping of goods is often rendered difficult by the fact that the goods are of varying sizes. This is true, for example, in the case of flat dish-like containers used for goods of irregular shape, such as various cuts of meat. Thus, it is sometimes necessary to use cuttings of the wrapping film of different sizes, for example when a plastic film capable of shrinking on heating is to be placed on a container opening and then shrunk around the rim of the container. Difficulties are encountered more particularly when goods of different sizes are to be wrapped in a continuous operation. It has not been possible to continuously operate in such cases with wrapping machines of simple design.

The present invention provides a method of wrapping a filled dish, or similarly shaped object, in a film having a weldable surface and also provides an apparatus for performing this method, which enables the disadvantages referred to above to be overcome in a relatively simple manner. According to the present method, the film is wrapped around the goods in a manner such as to form a length of an incompletely longitudinally closed tube which closely envelops the goods entirely or partially, the length of film tube being provided with transverse welded seams to tightly hold the goods in cut sections of the tube.

The present method is particularly suitable for wrapping articles of a compact form in a film. The new method is especially suitable for wrapping, for example, filled dish-shaped containers of a generally rectangular cross-section, and similarly shaped goods. Films suitable for such wrapping may be of any kind, provided the surface thereof can be welded. The wrapper may be, for example, paper or a film of regenerated cellulose, or a plastic film coated with a heat-weldable plastic, or a plastic film consisting entirely of a weldable plastic material. Such thermoplastic films are well known to the art.

The present method may be performed in a manner such that the tube has a longitudinal gap. The width of the gap may be variable after the film has been wrapped around the goods. Thus, the goods may be only partially wrapped, some portion thereof not being covered by the film, or the edges of the film may overlap. After the goods have been wrapped in the longitudinally open length of the tube, two transverse welded seams are made in the tube so that the goods are tightly wrapped in the longitudinally open length of tube. When wrapping a filled dish-like container, it is of advantage to locate the film in such a manner around the dish that the longitudinal opening of the length of tube is on the underside of the dish.

The present method can be used with great advantage with a heat-shrinkable film which is subsequently heat-shrunk around the rim of an open container over the contents thereof. As the heat-shrinkable film for wrapping there may be used, for example, biaxially or universally stretched polyolefin films of, for example, polyethylene or polypropylene, or stretched films of other plastics, such as polyester films, for example polyethylene terephthalates, polyvinylidene chloride or rubber hydrochloride, particularly such films having a thickness in the range of about 10 to 30µ.

The advantages afforded by the new method are particularly apparent when the wrapping operation is performed continuously. Continuous wrapping is relatively simple, and at the same time advantageous, when goods units such as filled dishes are continuously presented to a web of film of weldable plastic material, the film is wrapped around the units and, while they are continuously transported, a welded seam is formed close behind each unit in the longitudinally open film tube. In each welding and cutting operation, a closing welded seam is made in the piece of tube enveloping the unit which has just passed the welder and cutter and a first seam is made in the length of tube which surrounds the following unit. The continuous transport of the units causes the film web to be advanced by that unit which immediately follows a welded seam. Whenever a welded seam is made, the film web comes to a brief halt or it is slowed down until the following unit, in its advance, meets the newly made welded seam and carries the film web along until a further new welded seam is made.

The new method can be performed in the continuous manner described above by the use of relatively simple apparatus. Such an apparatus may comprise a track consisting of spaced track elements for supporting goods units to be wrapped in a manner such that the units are accessible, between the track elements, from below. A rotary endless conveyor engages the goods units from below the track to advance them along it, and supply means for a film web are mounted above the track. A cutting and welding means is located transversely of the track, for timed, sequential, transverse cutting and welding of the web, the arrangement being such that, in advancing, that unit immediately approaching the welding and cutting means behind a transperse weld in the film itself advances the film, the film being wrapped over advancing units on the track and the welding means being actuated again when the unit has passed it.

The welding and cutting means may be adapted for timed, sequential operation in a manner such that elements thereof which meet with the film between them to effect the weld are separately mounted for rotary motion on opposite sides of a welding plane.

One embodiment of the method and an apparatus for the performance thereof is described in greater detail by reference to the accompanying drawings in which:

FIGURE 1 is a diagrammatic view in elevation of an apparatus for performing the method, shown in operation;

FIGURE 2 is an enlarged and more detailed view in elevation of the welding and cutting portion of the apparatus shown in FIGURE 1, FIGURE 3a is a diagrammatic bottom view of a filled foodstuff container wrapped in a film, FIGURE 3b is a sectional view taken on line b—b of FIGURE 3a and looking in the direction of the arrows, and FIGURE 3c is a sectional view taken on line c—c of FIGURE 3b and looking in the direction of the arrows.

Referring to the drawings, the dishes 12 to be wrapped are placed on the track 3 and advanced with the aid of a revolving endless conveyor 1. To move the dishes, the cleats 2 project into the path of the dishes and push them forward. In a separate adjacent portion of the track 3, during continued movement of the dishes, a film web is wrapped around them to form an incomplete tube, which tightly partially envelops the dishes between the rails of the track and is open in the longitudinal direction on the underside of the dishes. It is advantageous that the open tube does not entirely cover the underside of the dishes but a small gap remains uncovered by the film, as shown in FIGURE 3a. The cleats 2 engage through the open slot in the tube. The film web is taken off a film supply roll 4 and supplied via rolls 4a and 4b to the conveyor track. The delivery of the required length of film for wrapping each dish is controlled in the following manner: On being advanced, a dish to be wrapped reaches a rotary cutting and welding device, having the arms 5 and 6, and this device is used to produce a welded seam across the tube which is still open on the underside thereof. During the advance, by means of one of the cleats 2, of a dish 12′, together with a cut and welded wrapper thereon formed from the film, the rear seam of which has just been made, a following dish 12″ is advanced on the track by another cleat 2, while the film which partially envelops the dish remains stationary until the dish 12″ meets the welded seam in front of it and, in continuing to advance, draws off additional film web from the film roll 4, to be used for wrapping a following dish. When a dish 12 has been transported past the point where the first transverse seam was formed, the operative elements of the cutting and welding devices 5 and 6, which elements since the first weld have been revolving, meet again, whereupon they form another cut and weld.

The cutter and welder shown in FIGURES 1 and 2 includes only one pair of cutting and welding elements. In some cases, it is advantageous to use a cutter and welder having two or more pairs of cutting and welding elements.

The cutting and welding element 10, for example a welding wire or a welding knife, used for severing the tube, is heated, for example by electrically produced heat from a permanent contact or impulse apparatus.

While the welding elements 5 and 6 are operative, the film web is pressed down by the holding means 7, located in front of and behind the welding element 10, onto a welding support 9, the holding means being loaded by the springs 8. The revolving motion of the welding element 10 and the welding support 9, on the welding arms 5 and 6, respectively, allows the method to be performed continuously.

By the continuous method described, the dishes may be wrapped in a heat-shrinkable plastic film and, after cutting the required length of film on the dish off of the web, the wrapped dish may be subjected to a heat treatment for the purpose of shrinking the film onto the goods in the dish and around the rim of the dish.

The method of the invention affords the advantage that it is possible to wrap compact articles in a relatively simple manner, more especially filled, dish-like containers, in a film. In this connection, it is of special advantage that the present wrapping method may also be applied to articles the height or width of which varies to a certain extent. According to this method, any such variation is compensated for by the fact that the longitudinal gap which remains in the tube surrounding the article can vary in width accordingly. It is a further advantage of the present method that the length of the article to be wrapped may also vary within certain limits without adversely affecting the continuous performance of the method. So far as the necessary length of film is concerned, compensation for any variation in the length of the articles to be wrapped is achieved automatically. It is the articles themselves that cause the film to be drawn off of the supply roll, so that a longer article will draw off a longer piece of film. It is another advantage that there is no need for a plurality of drive means, operating at varying speed, with their associated control devices. It is an outstanding advantage that the cutting and welding device is driven at a constant speed even during the welding operation.

It will be obvious to those skilled in the art that many modifications may be made within the scope of the present invention without departing from the spirit thereof, and the invention includes all such modifications.

What is claimed is:

1. A process for wrapping goods in a weldable film wrapper which comprises continuously moving the goods through a wrapping zone, wrapping the goods in a weldable film web so as to form an incompletely longitudinally closed tube around the goods, cutting and welding the web in front of the goods, and cutting and welding the web behind the goods.

2. A process according to claim 1 in which the web is advanced by the goods.

3. A process according to claim 1 in which the goods move at a constant speed.

4. A process according to claim 1 in which the cutting and welding steps are uniform, sequential operations.

5. A process according to claim 1 in which the film is heat-shrunk onto the goods.

6. A process according to claim 1 in which the goods are a plurality of individual units.

7. A process according to claim 6 in which the units are of substantially uniform size and shape.

8. A process according to claim 6 in which the units are of varying size and shape.

9. An apparatus for continuously wrapping goods in a weldable film wrapper which comprises supporting means for the goods in a wrapping zone, means for wrapping the goods in a weldable film web so as to form an incompletely longitudinally closed tube around the goods, advancing means for moving the goods through the wrapping zone, and cutting and welding means operative on the web sequentialy in front of and behind the goods.

10. An apparatus according to claim 9 in which the advancing means moves at a constant speed.

11. An apparatus according to claim 9 in which the supporting means comprises a pair of rails.

12. An apparatus according to claim 9 in which the advancing means is a constant speed conveyor.

13. An apparatus according to claim 9 in which the web is advanced by the goods.

14. An apparatus according to claim 9 in which the cutting and welding means comprises a pair of rotatable arms oppositely mounted with respect to a welding plane.

15. An apparatus according to claim 13 in which the advancing means is a constant speed conveyor the advancing portion of which passes below the supporting means and the cutting and welding means, said conveyor having attached at equal distances a plurality of cleats protruding from said conveyor, the protrusion being toward said supporting means when said cleats are in a position where they are members of said advancing portion, the activity of the cutting and welding means being kept in dependency of the movement of the conveyor as to actuate said welding and cutting means shortly after any of said cleats has passed it.

References Cited by the Examiner

UNITED STATES PATENTS 2,549,122  4/1951  Osterhof _____ 53—28
2,605,597  8/1952  Scheib _____ 53—182
3,128,584  4/1964  Muskat et al. _____ 53—180 X FRANK E. BAILEY, *Primary Examiner.*

L. S. BOUCHARD, *Assistant Examiner.*